(12) United States Patent
Brahmi et al.

(10) Patent No.: US 11,601,231 B2
(45) Date of Patent: Mar. 7, 2023

(54) RADIO DEVICE, METHOD TO OPERATE A RADIO DEVICE

(71) Applicant: Robert Bosch GmbH, Stuttgart (DE)

(72) Inventors: Nadia Brahmi, Hildesheim (DE); Johannes Von Hoyningen-Huene, Kiel (DE); Khaled Shawky Hassan, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 17/174,879

(22) Filed: Feb. 12, 2021

(65) Prior Publication Data

US 2021/0258110 A1 Aug. 19, 2021

(30) Foreign Application Priority Data

Feb. 14, 2020 (EP) .................................... 20157400

(51) Int. Cl.
  *H04L 1/18* (2006.01)
  *H04L 1/00* (2006.01)
  *H04L 1/1867* (2023.01)

(52) U.S. Cl.
  CPC .......... *H04L 1/1896* (2013.01); *H04L 1/0005* (2013.01); *H04L 1/0027* (2013.01)

(58) Field of Classification Search
  None
  See application file for complete search history.

(56) References Cited

U.S. PATENT DOCUMENTS

| | | | |
|---|---|---|---|
| 2003/0063587 A1* | 4/2003 | Cho | ...................... H04L 1/0029 370/335 |
| 2008/0298296 A1 | 12/2008 | Wu | |
| 2011/0044276 A1* | 2/2011 | Albert | ................... H04L 1/1887 370/329 |
| 2013/0178219 A1* | 7/2013 | Lee | ................... H04W 72/0426 455/450 |
| 2013/0229996 A1 | 9/2013 | Wang et al. | |
| 2015/0091726 A1 | 4/2015 | Lindig et al. | |
| 2016/0278066 A1* | 9/2016 | Sakurai | ..................... H04L 1/14 |

(Continued)

FOREIGN PATENT DOCUMENTS

| | | |
|---|---|---|
| EP | 1289181 A1 | 3/2003 |
| EP | 3340713 A1 | 6/2018 |

OTHER PUBLICATIONS

European Patent Office Partial Search Report for Application No. 20157400.1 dated Aug. 20, 2020 (10 pages).

*Primary Examiner* — Saad Khawar
(74) *Attorney, Agent, or Firm* — Michael Best & Friedrich LLP

(57) ABSTRACT

A method to operate a transmitting radio device of a radio communications network is provided, wherein the method comprises: transmitting (102), towards a receiving radio device, first data according to a first transmit mode; determining (104) a last reception time when a positive acknowledgment was received from the receiving radio device, the positive acknowledgement indicating a successful reception of the transmitted first data at the side of the receiving radio device; and transmitting (106), towards the receiving radio device, second data according to a second transmit mode, wherein the second transmit mode is activated upon expiry of a first transmit mode time period since the determined last reception time.

14 Claims, 7 Drawing Sheets

(56) References Cited

U.S. PATENT DOCUMENTS

2017/0005758 A1* 1/2017 Baldemair ............ H04L 5/0055
2018/0279140 A1* 9/2018 Chandrane ............ H04W 24/04
2019/0327678 A1* 10/2019 Lin ................... H04W 52/0229

* cited by examiner

RADIO DEVICE, METHOD TO OPERATE A RADIO DEVICE

BACKGROUND OF THE INVENTION

The present invention relates to radio devices of radio communication networks and methods to operate the radio devices.

In modern wireless communication systems forward error correction (FEC) and automated repeat request (ARQ) and/or a hybrid automated repeat request (HARQ) are used to ensure a successful message reception in the case of transmission errors (e.g., in case of channel errors or packet loss). With FEC, redundancy is added to the data payload, which can be used to correct the message at the receiver side until a certain number of bit errors.

Recently, the term survival time has been proposed to be considered in the 5G specifications, i.e., considering the special requirements from time-critical industrial applications or from safety-critical automotive applications.

SUMMARY OF THE INVENTION

According to a first aspect of the description a transmitting radio device of a radio communications network, in particular of a cellular radio communications network, is provided, wherein said transmitting radio device comprises at least one processor, at least one memory comprising computer program code, at least one communication module, and at least one antenna, wherein the computer program code is configured to interact with the at least one processor, the at least one communication module, and the at least one antenna to cause the transmitting radio device at least to: transmit, towards a receiving radio device, first data according to a first transmit mode; determine a last reception time when a positive acknowledgment was received from the receiving radio device, the positive acknowledgement indicating a successful reception of the transmitted first data at the side of the receiving radio device; and transmit, towards the receiving radio device, second data according to a second transmit mode, wherein the second transmit mode is activated upon expiry of a first transmit mode time period since the determined last reception time.

The communication service reliability and communication service availability are complementary to packet error rate. PER can be used to indicate the significance of individual packet losses, which for many of the industrial applications differs from the significance of losing several consecutive packets. For example, loss of a single packet may only slightly reduce the quality of experience of an industrial application, while loss of several consecutive packets is considered as communication service unavailability potentially resulting in an emergency stop in the application. By dividing the time in a first transmit mode and a second transmit mode, the radio domain benefits on the one hand as the first transmit mode is less resource demanding. On the other hand, an application will benefit, as the second transmit mode will increase the probability of transmission success and to avoid reaching a survival time.

The application exchanges data in a periodic way, that means by applying a certain cycle time for transmission of the time-critical data. The requirement of the application is that at least one message is successfully delivered to the receiver (or all receivers) within the survival time. For example, in industrial communication systems or automotive applications (e.g. platooning) these applications occur. Additional transmission resources to increase the probability of a successful end-to-end transmission are utilized, when the survival time is about to be exceeded (which should be avoided) meaning that the second transmit mode gets aggressive as getting close the survival time expiration.

A highly reliable transmission of data is achieved. Before reaching the survival time appropriate actions according to the second transmit mode are initiated. With this approach, the demanding requirements of time-critical applications are addressed and the use of transmission resources is being optimized.

Therefore, before becoming unavailable, the communication service will have an increased quality of experience.

According to a second aspect of the description a method to operate a transmitting radio device of a radio communications network, in particular of a cellular radio communications network is provided, wherein the method comprises: transmitting, towards a receiving radio device, first data according to a first transmit mode; determining a last reception time when a positive acknowledgment was received from the receiving radio device, the positive acknowledgement indicating a successful reception of the transmitted first data at the side of the receiving radio device; and transmitting, towards the receiving radio device, second data according to a second transmit mode, wherein the second transmit mode is activated upon expiry of a first transmit mode time period since the determined last reception time.

According to a third aspect a receiving radio device of a radio communications network, in particular of a cellular radio communications network, is provided, wherein said receiving radio device comprises at least one processor, at least one memory comprising computer program code, at least one communication module, and at least one antenna, wherein the computer program code is configured to interact with the at least one processor, the at least one communication module, and the at least one antenna to cause the receiving radio device at least to: receive, from a transmitting radio device, first data; determine a last reception time when the first data was successfully received from the transmitting radio device; and transmit, towards the transmitting radio device, a second transmit mode indicator upon expiry of a first transmit mode time period since the determined last reception time.

A highly reliable transmission of data is achieved. Before reaching the survival time appropriate actions according to the second transmit mode are initiated. With this approach, the demanding requirements of time-critical applications are addressed and the use of transmission resources is being optimized.

According to an advantageous example, the receiving radio device is configured to transmit, towards the transmitting device, a first transmit mode indicator upon successfully receiving second data from the transmitting device.

Advantageously, the receiving device controls the transmitting device to enter the first transmit mode upon a successful reception of data.

A fourth aspect of the description refers to a method to operate a receiving radio device of a radio communications network, in particular of a cellular radio communications network, wherein the method comprises: receiving, from a transmitting radio device, first data; determining a last reception time when the first data was successfully received from the transmitting radio device; and transmitting, towards the transmitting radio device, a second transmit mode indicator upon expiry of a first transmit mode time period since the determined last reception time.

According to a fifth aspect a transmitting radio device of a radio communications network, in particular of a cellular radio communications network, is provided, wherein said transmitting radio device comprises at least one processor, at least one memory comprising computer program code, at least one communication module, and at least one antenna, wherein the computer program code is configured to interact with the at least one processor, the at least one communication module, and the at least one antenna to cause the transmitting radio device at least to: transmit, towards a receiving radio device, first data according to a first transmit mode; receive, from the receiving radio device, a second transmit mode indicator; and transmit, towards the receiving radio device, second data according to a second transmit mode, wherein the second transmit mode is activated upon reception of the second transmit mode indicator.

According to an advantageous example, the transmitting radio device is configured to receive, from the receiving device, a first transmit mode indicator indicating a successful reception of the second data by the transmitting device; and transmit, towards the receiving radio device, first data according to the first transmit mode upon the reception of the first transmit mode indicator.

A sixth aspect of the description provides a method to operate a transmitting radio device of a radio communications network, in particular of a cellular radio communications network, wherein the method comprises: transmitting, towards a receiving radio device, first data according to a first transmit mode; receiving, from the receiving radio device, a second transmit mode indicator; and transmitting, towards the receiving radio device, second data according to a second transmit mode, wherein the second transmit mode is activated upon reception of the second transmit mode indicator.

A seventh aspect of the description provides a transceiving radio device of a radio communications network, in particular of a cellular radio communications network, wherein said transceiving radio device comprises at least one processor, at least one memory comprising computer program code, at least one communication module, and at least one antenna, wherein the computer program code is configured to interact with the at least one processor, the at least one communication module, and the at least one antenna to cause the transceiving radio device at least to: receive, from a transmitting radio device, first data; transmit, to a receiving radio device, the first data; determine a last reception time when a positive acknowledgment was received from the receiving radio device, the positive acknowledgement indicating a successful reception of the transmitted first data at the side of the receiving radio device; and transmit, towards the transmitting radio device, a second transmit mode indicator upon expiry of a first transmit mode time period since the determined last reception time.

A highly reliable transmission of data is achieved. Before reaching the survival time appropriate actions according to the second transmit mode are initiated. With this approach, the demanding requirements of time-critical applications are addressed and the use of transmission resources is being optimized.

An eighth aspect of the description provides a method to operate a transceiving radio device of a radio communications network, the method comprising: receiving, from a transmitting radio device, first data; transmitting, to a receiving radio device, the first data; determining a last reception time when a positive acknowledgment was received from the receiving radio device, the positive acknowledgement indicating a successful reception of the transmitted first data at the side of the receiving radio device; and transmitting, towards the transmitting radio device, a second transmit mode indicator upon expiry of a first transmit mode time period since the determined last reception time.

An advantageous example provides that the first transmit mode time period is smaller than a sum of a survival time period of an application unit and a cycle time of the application unit, in particular the half of the sum of the survival time period and the cycle time.

Advantageously, the application unit will perceive an increased data delivery success. Therefore, the proposed scheme protects the application unit from being shut down or go to a safe mode when reaching the survival time period.

An advantageous example provides that the first transmit mode time period is greater than the cycle time period of the application unit, wherein the cycle time period indicates a cyclic provision of data by an application unit and a cyclic transmission of data towards the receiving radio device.

The first transmit mode time period chosen that way will increase the communication service availability on the one hand. On the other hand, the first transmit mode does not unnecessarily "flood" the radio domain with unnecessary replications of the same message or will immediately occupy radio resources.

An advantageous example provides that the second transmit mode comprises, in comparison with the first transmit mode, at least one of the following: an increased number of re-transmissions for the second data that was not successfully received at the receiving radio device or at the transceiving radio device; an increased number of blind re-transmissions for the second data; a different modulation and coding scheme for the second data; and an increased number of allocated radio resources for the transmission of the second data.

Advantageously, these measures contribute to increase the reliability of the transmission before reaching the survival time.

An advantageous example provides that the second transmit mode indicator is transmitted towards a scheduling unit in order to schedule additional resources for the second transmit mode.

Accordingly, the scheduling unit will schedule appropriate resources available in the second mode in order to increase the transmission probability of the second data.

An advantageous example provides that an application unit of the transmitting device adds the first and second data at one end of an egress queue of a control unit, and that the control unit of the transmitting device removes the first and second data from the other end of the queue in order to transmit the first and second data towards the receiving device.

Advantageously, if the queue is empty and the transmitting device enters the second transmit mode, a previously unsuccessfully transmitted data packet is not repeated but the queue is monitored for new cyclic arriving data to be transmitted. This reduces transmission overhead during the first and second mode.

DETAILED DESCRIPTION

Figure 1:
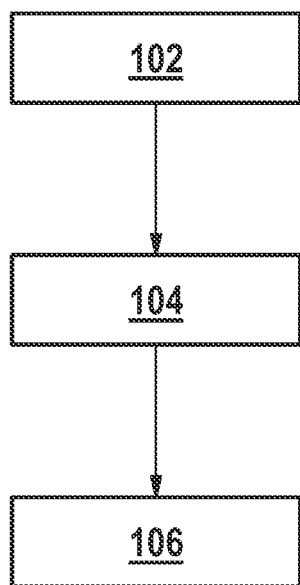
FIGS. 1, 3, 4, and 6 each depict a schematical flow diagram.

FIG. 1 depicts a schematical flow diagram for operating a transmitting radio device of a radio communications network, in particular of a cellular radio communications network. According to a step 102, the transmitting radio device transmits, towards a receiving radio device, first data according to a first transmit mode. According to a step 104, the transmitting device determines a last reception time of when a positive acknowledgment was last received from the receiving radio device, wherein the positive acknowledgement indicates a successful reception of the transmitted first data at the side of the receiving radio device. According to a step 106, the transmitting radio device transmits, towards the receiving radio device RxDev, second data according to a second transmit mode, wherein the second transmit mode is activated upon expiry of a first transmit mode time period since the determined last reception time.

Figure 2:
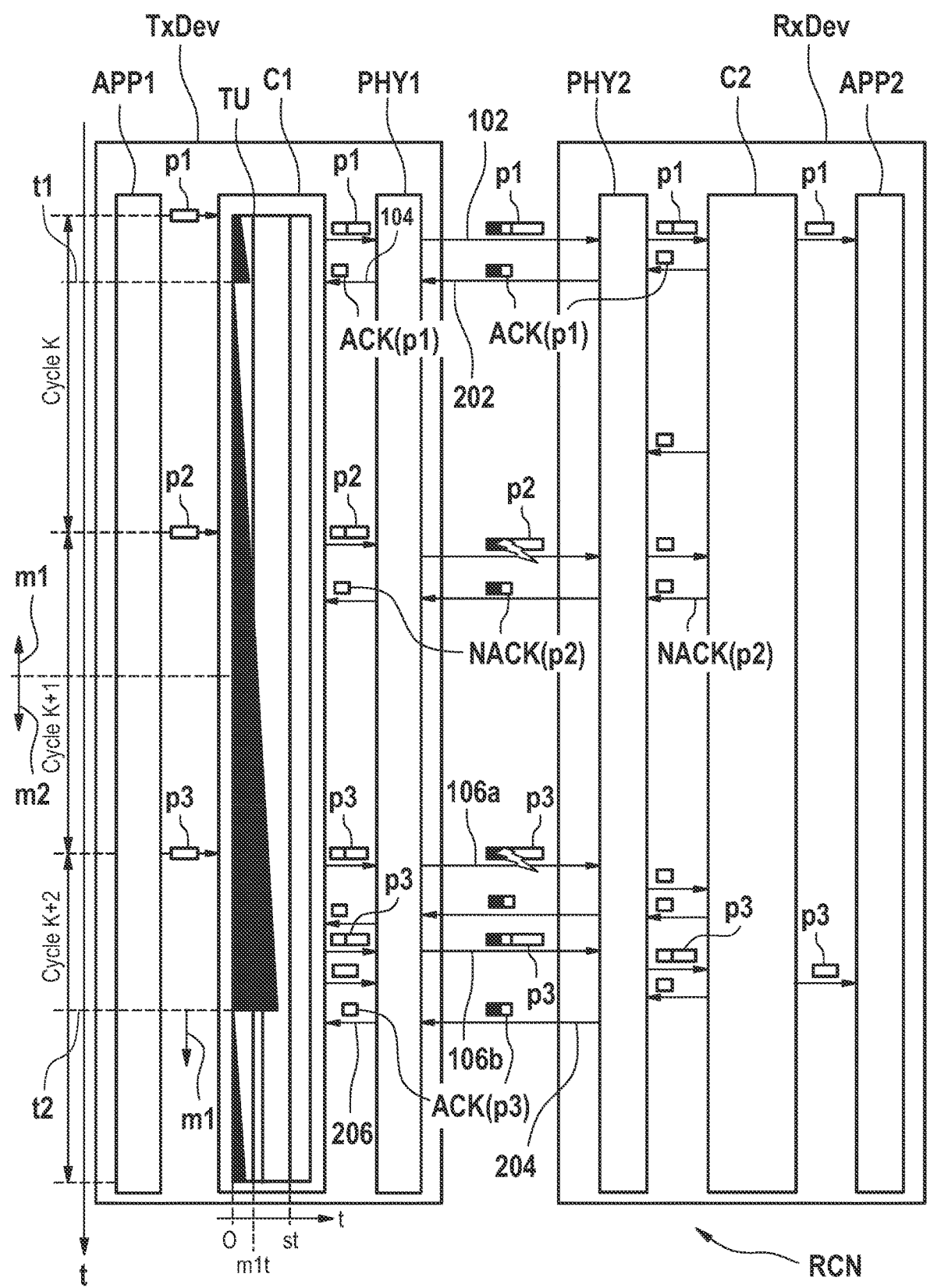
FIGS. 2, 5, and 7 each depict a schematical sequence diagram.

FIG. 2 depicts a schematical sequence diagram for operating a transmitting radio device TxDev of the radio communications network RCN. The transmitting device TxDev, in particular a physical layer block PHY1 transmits, according to the step 102, towards a receiving radio device RxDev, first data p1, p2 according to the first transmit mode m1.

A positive acknowledgement ACK(p1) is received, according to a step 202, from the receiving device RxDev. TxDev determines, according to the step 104 a last reception time t1 when the positive acknowledgment ACK(p1) was received from the receiving radio device RxDev. The positive acknowledgement ACK(p1) indicates the successful reception, by a controller unit C2 the receiving radio device RxDev, of the transmitted first data p1.

The second transmit mode m2 is activated at the point in time t2. The point in time t2 indicates that a first transmit mode time period m1t has lapsed since the point in time t1. Consequently, the transmitting radio device TxDev transmits, according to steps 106a, 106b, towards the receiving radio device RxDev, the second data p3 according to the second transmit mode m2, wherein the second transmit mode m2 is activated upon expiry of a first transmit mode time period m1t since the determined last reception time t1.

Upon receiving, from the receiving radio device RxDev, according to a step 204, a positive acknowledgement ACK (p3) for data p3 transmitted in the second transmit mode m2, the transmitting radio device TxDev enters, according to a step 206, the first transmit mode m1.

ARQ, Automatic Repeat Request comprises: After the first successful transmission in cycle K, there could be either no repetition or limited number of repetitions is applied in cycle K+1, i.e., in case of a transmission failure in the said cycle K+1. In this cycle K+1, there is no risk of exceeding the survival time, e.g., if the sum of the survival time period and the cycle time period is defined to be the double of the first transmit mode time. However, if also the transmission in cycle K+2 fails, the survival time of the application would be exceeded and the application will fail. To prevent this, automatic repetitions are enabled, according to the second transmit mode m2, in this cycle K+2 to ensure a successful transmission of the data p3.

At the transmitting radio device TxDev, a counter value, for example a timer unit TU, related to the first transmit mode m1, the second transmit mode m2, and the survival time is steadily incremented, which represents the time since the last successful transmission and is reset every time an ACK message is received from the receiving radio device RxDev for a successful reception of a PDU message. In the case a NACK is received or the transmitting radio device TxDev does not receive a message at all (this includes also the loss of an ACK message) the counter value is not reset and continues to be incremented. The transmitting device TxDev changes its behavior correspondingly to the current value of the timer unit TU. If the first transmit mode threshold m1t is reached, a the second transmit mode m2 is activated to increase the reliability of the transmission and ensure a successful packet transmission within the survival time.

According to an example, the parameters of the timer unit TU like m1t and st are configured via dedicated signaling, for example, RRC signaling or by higher layers (e.g., application layer). The timer unit TU may be conveyed by upper layers which triggers the lower layer adaptive reliable mechanisms, e.g., increasing diversity, packet duplication, etc. Once the timer unit TU is conveyed, each process, of these high reliable mechanisms, has to be triggered with the said counter. In the former case, RRC configuration may not be needed for configuring the parameters of the timer unit TU.

For example, the TxDev receives the packet in its buffer or egress queue, and is ready to be transmitted, at a time offset T_offset. Hence, the TxDev resets the timer to T=T_offset. After the TxDev sends the data it starts to increment the counter of the timer unit TU continuously. If the TxDev receives an ACK which is associated to first transmitted data, the TxDev resets the Timer T back to T=T_offset. If the first data fails to be decoded at RxDev, RxDev generates a negative acknowledgment (NACK) back to the TxDev. If TxDev receives a NACK associated to a previously transmitted data packet (for example in cycle 2) or does not receive an ACK within a given duration (timer), TxDev does the following: TxDev triggers its reliable mechanisms in form of the second transmit mode m2 (related to increasing for the next packet duplication, HARQ retransmission, etc.). The TxDev leaves the TU timer to increase further.

TxDev sends a further data, in the third cycle with the reliable metric according to the second transmit mode as above. If data p3 is not received correctly and a NACK is generated by RxDev and received the TxDev, or p3 was received correctly and an ACK was transmitted, but this ACK was not correctly received by the TxDev due to the feedback channel error, HARQ precoding ambiguity, etc., then the survival time period st is reached. In this case, a system failure is indicated or other resilience mechanism is initiated by the application APP1 of TxDev.

Figure 3:
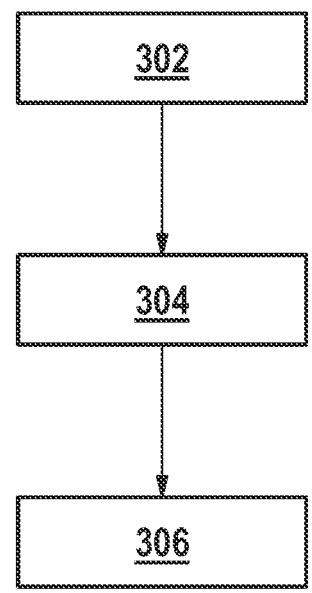

FIG. 3 depicts a schematical flow diagram for operating the receiving radio device of the radio communications network RCN. According to a step 302, the receiving radio device receives from a transmitting radio device first data. According to a step 304, the receiving radio device determines a last reception time, when the first data was successfully received from the transmitting radio device. According to a step 306, the receiving radio device transmits, towards the transmitting radio device, a second transmit mode indicator upon expiry of a first transmit mode time period since the determined last reception time.

Figure 4:
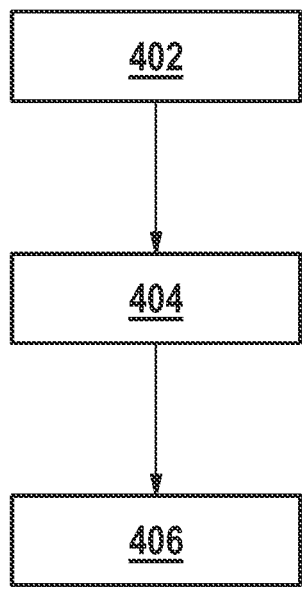

FIG. 4 depicts a schematical flow diagram for operate a transmitting radio device, which is paired with the receiving radio device of FIG. 3. According to a step 402, the transmitting radio device transmits, towards the receiving radio device, first data according to the first transmit mode. According to a step 404, the transmitting device receives, from the receiving radio device RxDev, a second transmit mode indicator. According to a step 406, the transmitting radio device transmits, towards the receiving radio device, second data according to a second transmit mode, wherein the second transmit mode is activated upon reception of the second transmit mode indicator.

Figure 5:
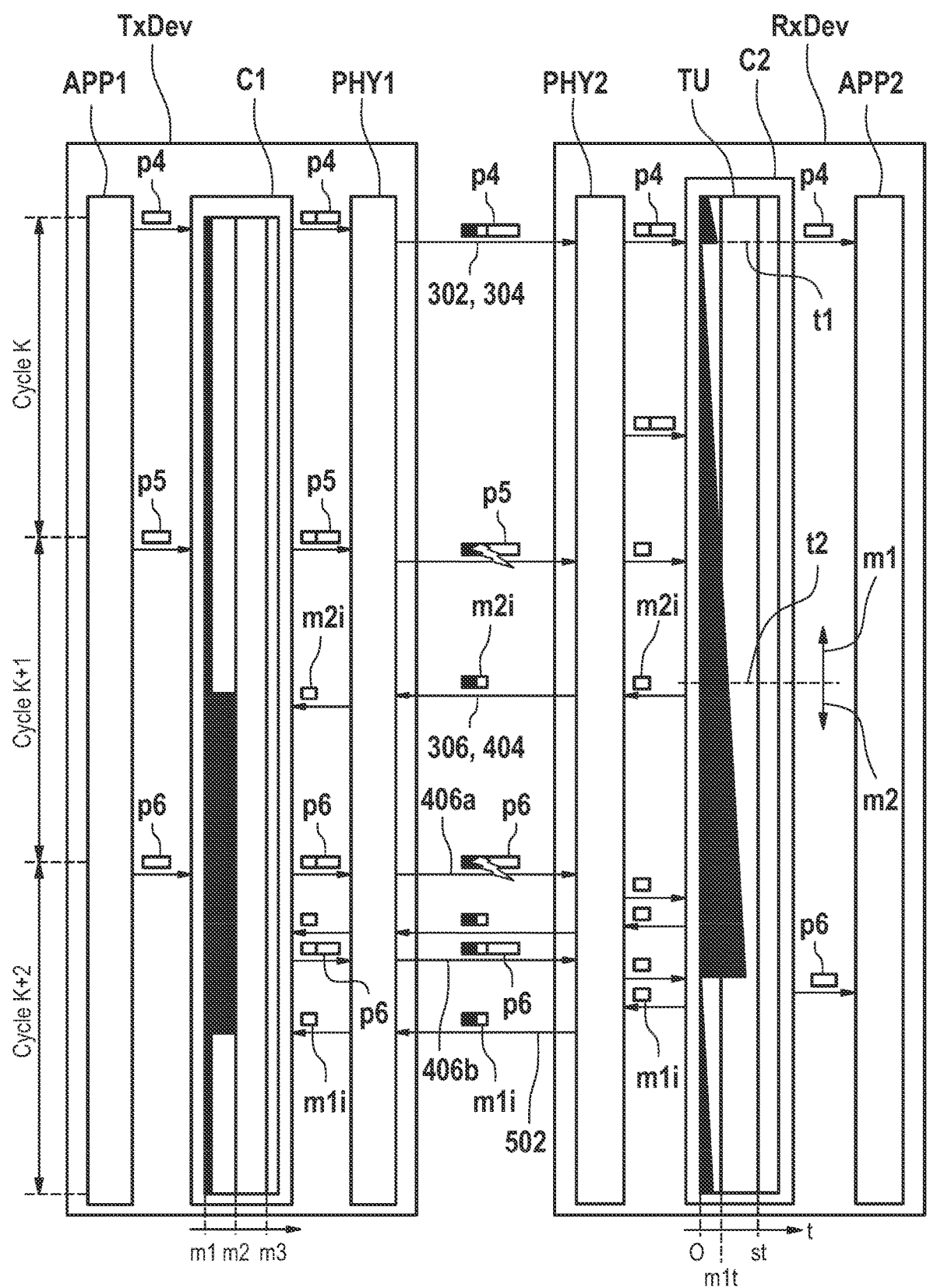

FIG. 5 depicts a schematical sequence diagram. The transmitting radio device TxDev transmits, according to the step 402, towards the receiving radio device RxDev, first data p4, p5 according to the first transmit mode m1.

The receiving radio device RxDev determines, according to the step 304 of FIG. 3 the last reception time t1 when the first data p4 was successfully received from the transmitting radio device TxDev. The receiving radio device RxDev transmits, according to the step 306, towards the transmitting radio device TxDev, a second transmit mode indicator m2i upon expiry of a first transmit mode time period m1t since the determined last reception time t1.

The transmitting radio device TxDev receives, according to the step 404, from the receiving radio device RxDev, a second transmit mode indicator m2i and enters the second transmit mode m2.

The transmitting radio device TxDev transmits, according to steps 406a, 406b, towards the receiving radio device RxDev, second data p6 according to a second transmit mode m2, wherein the second transmit mode m2 is activated upon reception of the second transmit mode indicator m2i. The receiving radio device RxDev receives, according to the step 302, from the transmitting radio device TxDev, the first data p4.

The receiving radio device RxDev transmits, according to a step 502, towards the transmitting device TxDev, a first transmit mode indicator mli upon successfully receiving the second data p6 from the transmitting device TxDev.

The transmitting radio device TxDev receives, according to the step 502, from the receiving device RxDev, the first transmit mode indicator m1i indicating a successful reception of the second data p6 by the transmitting device TxDev. Upon reception of the first transmit mode indicator m1i, the transmitting radio device TxDev enters the first transmit mode.

Like in step 402, the transmitting radio device TxDev transmits, towards the receiving radio device RxDev, first data p1, p2 according to the first transmit mode m1 upon the reception of the first transmit mode indicator mli.

The timer unit TU is implemented at the receiver side and triggers the increased reliability in form of the second transmit mode m2. RxDev is the device that is more susceptible to errors and failure when the survival time is exceeded. As defined in an industrial communication context, the up/down state of an application in form of APP1 and APP2 is based on correctly received messages at RxDev. The communication service will start a down phase, if a packet/data is lost or is not correctly received at RxDev. If RxDev stays in the down phase longer than the survival time, the higher layer may be notified to act appropriately.

The counter value or the timer of the timer unit TU is reset (to zero or another predefined value) if a PDU message/data is successfully received. Once a maximum value (e.g. configured or preconfigured threshold) in form of m1t is reached, RxDev notifies TxDev to apply it's the second transmit mode to improve the reliability and ensure a successful packet reception before the expiration of the survival time. After the next successful reception, RxDev resets its local counter/timer and may signal the new status to TxDev at step 502.

According to an example, RxDev sets the lower layer timer unit TU or a number of consecutive packet losses M after which the RxDev declares a failure. The timer unit TU is configured by the network or conveyed by upper layers. The upper layers convey (upon expiration of an upper layer Timer T or a partial expiration of the survival time) an indication requesting RxDev to perform one or more of the following procedures: Start to perform a more robust ACK/NACK transmission; Inform TxDev about the running survival timers/counters and request more robust transmission, i.e., increase reliability as discussed above.

According to an example, RxDev informs TxDev about the down time in the communication services via more detailed ACK/NACK reports or more detailed CSI reports (including timer/counter information, etc.). RxDev indicates detailed scheduling assignments/control channel including timer/counter information, etc., to the base station and/or to the TxDev in case of direct communication between TxDev and RxDev regarding resources scheduling. An information about survival timer could be transmitted to TxDev. Possible robust transmission/re-transmission, e.g., reduced MCS, duplication, can be transmitted to TxDev. Re-prioritization of any intra device transmission prioritization can be transmitted to TxDev.

According to an example, TxDev is informed about the state of the timer unit TU during ACK/NACK using a toggling field. In order to keep track on the ACK/NACK at the TxDev and make sure that any ACK/NACK loss will considered at the TxDev to avoid losing the survival time information at the RxDev, the RxDev shall: Insert 1-bit field to the ACK/NACK such that the bit is toggled every time the RxDev sends either ACK or NACK. In this case: E.g., if the RxDev sends ACK (with the field=0), Next time NACK (with the field=1), followed by ACK (with the field=0), and followed by ACK (with the field=1). Hence, if the TxDev misses the third feedback (ACK) it will miss also the field toggle for one time. However, if the TxDev receives the following ACK (fourth feedback), it will figure that the field is not toggled. Hence, the TxDev can interpret this event to be a loss of ACK/NACK According to an example, more than 1-bit field is in inserted into ACK/NACK feedback. For example, a 2-bit field can be used, 1 bit (e.g. LSB) indicates the toggling and the other bit (MSB) indicates the time within the survival timer, e.g., 0 indicates that the timer is in the first ½, first ¼, etc. and 1 indicates that the timer is in the last ½, ¼ of the survival time period and the cycle time.

According to an example, a 2-bit field or more is inserted into ACK/NACK feedback, indicating the timer value or quantized value—E.g., 3-bit field can quantize ⅛ T of the timer, e.g., 000=first ⅛T.

In case when the survival timer/counter is expired, RxDev or TxDev shall:
- according to an example, notify the higher layer about this event. The higher layer itself may enter a safe mode or resilience mode or application stops until the recovery time, where the communication service may continue listening to the TX and wait for a new command or configurations
- according to an example, inform other communication participants (e.g. the radio devices involved in the same communication) about the failure or recovery phase.

Figure 6:
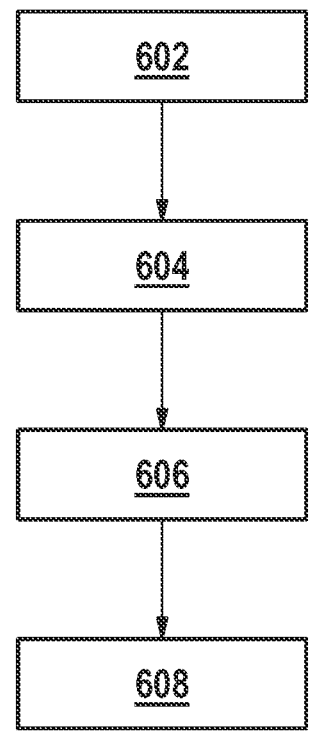

FIG. 6 depicts a schematical flow diagram to operate a transceiving radio device of a radio communications network. The transceiving radio device receives, according to a step 602, from a transmitting radio device TxDev, first data. The transceiving radio device transmits, according to a step 604, to the receiving radio device, the first data. The transceiving radio device determines, according to a step

606, a last reception time when a positive acknowledgment was received from the receiving radio device, the positive acknowledgement indicating a successful reception of the transmitted first data at the side of the receiving radio device. The transceiving radio device transmits, according to a step 608, towards the transmitting radio device, a second transmit mode indicator upon expiry of a first transmit mode time period since the determined last reception time.

Figure 7:
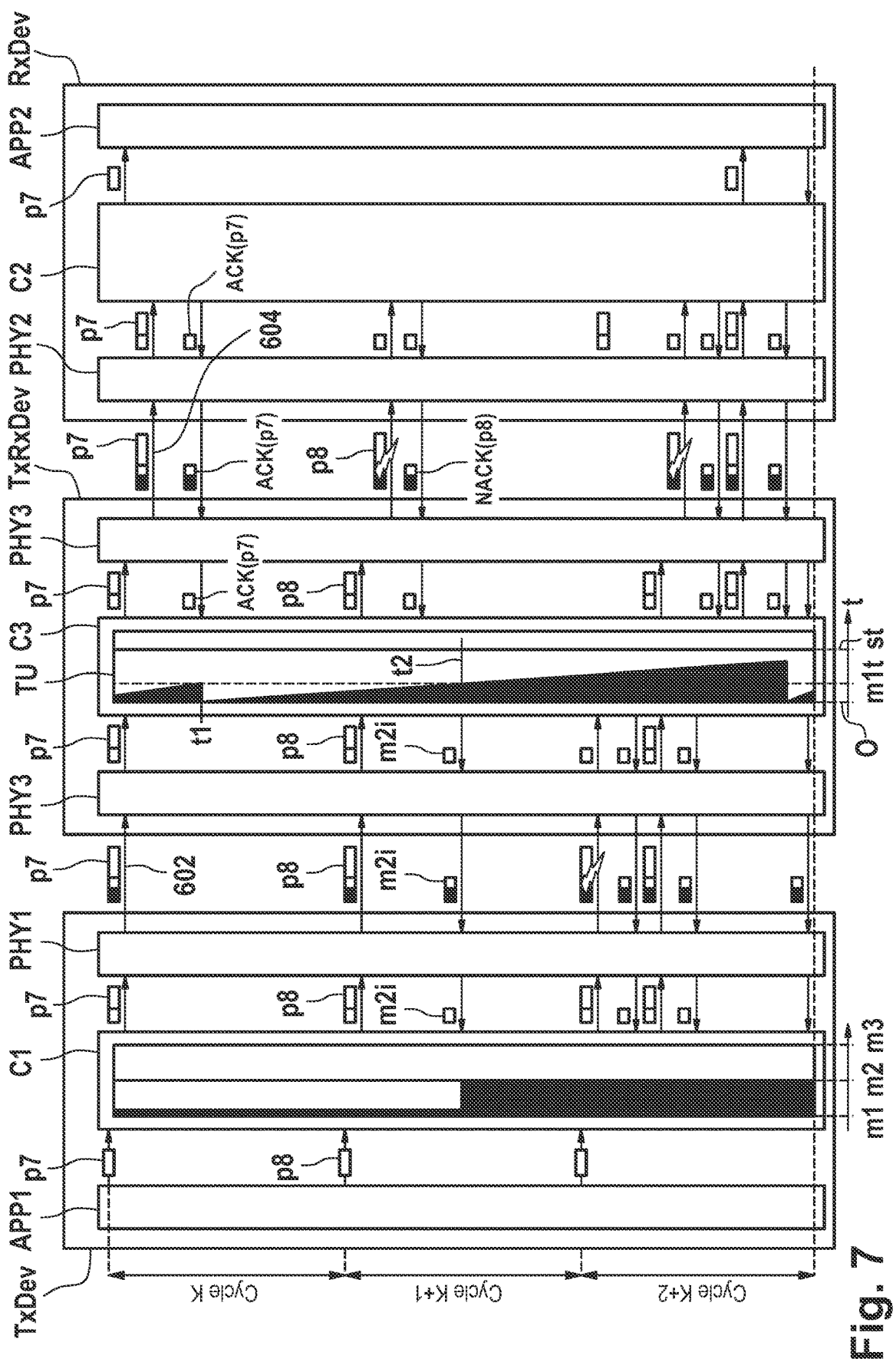

FIG. 7 depicts a schematical sequence diagram. The transceiving radio device TxRxDev receives, according to the step 602, from the transmitting radio device TxDev, first data p7, p8. The transceiving radio device TxRxDev transmits, according to the step 604, to the receiving radio device RxDev, the first data p7, p8. However, the first data p8 is not received correctly, for example could not be correctly decoded at the PHY unit PHY2 of the receiving radio device RxDev.

The transceiving radio device TxRxDev determines, according to a step 606, a last reception time t1 when a positive acknowledgment ACK(p7) was received from the receiving radio device RxDev, the positive acknowledgement ACKp7 indicating a successful reception of the transmitted first data p7 at the side of the receiving radio device RxDev.

The transceiving radio device TxRxDev transmits, according to the step 608, towards the transmitting radio device TxDev, the second transmit mode indicator m2i upon expiry of a first transmit mode time period m1t since the determined last reception time t1.

The following applies to each example in FIGS. 1 to 7.

At least one communication entity according to the transmitting, receiving or transceiving radio device TxDev, RxDev, TxRxDev includes a counter unit or timer unit TU or similar unit to measure the time until the first transmit mode first transmit mode time period m1t and until the survival time is exceeded.

This description provides means for increasing the reliability of the transmission of data, which is time-critical, within the survival time of a time critical application comprising the application units APP1 and APP2, while being efficient with the available transmission resources. Therefore, the data described herein can be termed time-critical data. However, the application tolerates a certain level of data loss.

Survival time is defined in TS22.104 as "the time that an application consuming a communication service may continue without an anticipated message". It has been identified as one influential quantity for periodic deterministic communication (Table 5.2-1 in TS 22.104). The survival time indicates to the communication service the time available to recover from message delivery failures. The survival time is expressed as a time period, which, especially with cyclic traffic, accommodates the maximum number of consecutive incorrectly received or lost messages that can be tolerated without causing an application layer failure.

According to an example, the radio resources and the radio parameters are assigned by a central coordination node (i.e. base station, access point, roadside unit). According to one example, the second transmit mode indicator m2i is additionally transmitted towards a scheduling unit in order to schedule additional resources for the second transmit mode m2.

According to an example, the radio resources are determined in a distributed way and each participating radio device can select the used radio resources autonomously from configured or preconfigured resources.

This time critical application comprises that the transmitting radio device TxDev periodically transmits the time-critical data to one or more receiving radio devices RxDev. The time duration between two consecutive message transmissions is denoted as cycle time. The transmitted data include redundancy to allow forward error correction (up to a certain number of bit errors) and error detection of uncorrectable data.

According to an example, if the transmitting radio device uses retransmissions either based on retransmission grants or autonomous retransmission, there are more than one transmission opportunities per transmission direction in each communication cycle.

According to an example, the messages of the time-critical stream/flow are identified by transmitting a corresponding indicator together with the transmitted time-critical data.

According to an example, the application unit APP2 at the receiving radio device RxDev is considered working correctly, if at least one message of data is received and decoded correctly within the survival time period. The survival time exceeds the cycle time.

According to an example, the first transmit mode time period m1t is greater than a cycle time period k of the application unit APP1; APP2, wherein the cycle time period k indicates a cyclic provision of data by an application unit APP1; APP2 and a cyclic transmission of data towards the receiving radio device RxDev.

According to an example, the first transmit mode time period m1t is smaller than a survival time period st of an application unit APP1, APP2, in particular the half of the sum of the survival time period st and the cycle time period.

According to an example, the second transmit mode m2 comprises, in comparison with the first transmit mode m1, at least one of the following:

an increased number of re-transmissions for the second data that was not successfully received at the receiving radio device RxDev or at the transceiving radio device TxRxDev, in particular in the case of ARQ and ARQ;

an increased number of blind re-transmissions for the second data;

different channel bandwidth, different bandwidth part, different resource pool;

a different modulation and coding scheme for the second data; and an increased number of allocated radio resources for the transmission of the second data;

packet duplication (on another frequency resources, different technology (e.g., different interface [over another Sidelink or Uu interface), different radio access technology, different frequency range (e.g., mmWave), or multi-connectivity).

The application unit APP1 of the transmitting device TxDev adds the first and second data at one end of an egress queue of a control unit C1, and wherein the control unit C1 of the transmitting device TxDev removes the first and second data from the other end of the queue in order to transmit the first and second data towards the receiving device RxDev.

A setup procedure for the described methods comprises:

1. The master of the time critical application, APP1 or APP2, requests the setup of time-critical and highly reliable communication stream from the management of the communication systems, for example via appropriate scheduling requests to the base station unit. Such a request includes one of the following: The source and destination of the connection; The amount of data to be exchanged within each communication cycle; The cycle time of the data exchange; The survival time of the application at RxDev; Identifier of time critical messages to be recognized by radio devices of the wireless communication system; a metric of criticality. Configuration may be directed from, e.g., a network via, e.g., a base-station, to a radio device. Furthermore, the configuration parameters (including one or more of the above) can be configured during setup, may be configured periodically, or may be configured on demand.

2. The management of the wireless communication system, for example the base station unit, checks if the required requests can be satisfied. Depending on the location of RxDev and TxDev for the PDU connection within the network (at the network side or at a radio terminal) and the current network configuration, the management unit calculates parameters for the communication stream, the parameters comprising at least one of: Unique identifiers communication stream; Identifier for source and destination of PDU connection; Cycle time of the communication stream; Location of the timer unit TU to measure the time since last successful transmission; Methods to signal successful or not successful transmission from the receiver to the transmitter (NACK); Methods to signal resource allocations (especially in the case when the reliability is changed; a set of communication parameters with moderate reliability and high efficiency to be used, when the survival time is not about to be exceeded soon (transmit mode m1), a set of communication parameters with high reliability and reduced efficiency to be used, when the survival time is about to be exceeded soon (transmit mode m2); a further set of communication parameters, when survival time exceeds more than two communication cycle times and multiple levels of reliability (and efficiency); a threshold of the counter value, which represents that the survival time is about to be exceeded soon; a threshold of the counter value, which represents that the survival time is exceeded; details about the procedure in the case the survival time is exceeded.

3. The management of the wireless communication system deploys these communication parameters to all incorporated devices of the considered communication stream.

4. The devices apply the configuration parameters and reply to the communication management, if they are ready to proceed.

5. Once the communication management gets the positive acknowledgement from all required devices, it replies to the application master, that the time-critical and reliable stream has been established.

6. The application master then notifies the PDU source that means TxDev, to periodically transmit its time-critical data towards RxDev. With this step, the setup phase is finished and the run-time phase is entered.

The procedure during run-time operation of the provided data transmission scheme comprises:

1. The source of application data APP1 periodically generates time-critical data in form of a PDU message and forwards it to its communication layer in form of the control unit C1.

2. The communication layer in form of the control unit C1 in the TxDev send the PDU messages according to the current communication settings (mode 1 vs. mode 2, etc.) via the wireless channel to RxDev.

3. The RxDev checks if transmission has been successful.

4. With successful reception, the PDU message is forwarded to the higher layer C2 and APP2. In the case of scenario of FIGS. 6 and 7, the PDU message is forwarded to the PHY unit PHY3 of the second wireless section.

5. If the reception has not been successful in the current communication cycle, this may also be signaled to the higher layer APP1 and/or APP2.

6. The status of the transmission is signaled to TxDev according to the configured method (ACK/NACK).

7. The radio device, which incorporates the timer unit TU, continuously increments the counter value with a constant rate.

8. The event of a successful transmission leads to a reset of the counter value of the timer unit TU. If the counter is located at RxDev, a device-internal signal is sufficient. If the counter is located at the TxDev, a control message is transmitted towards the RxDev.

9. At least once in each communication cycle, the counter value is compared to the configured threshold(s). If a threshold has been crossed, the transmission mode is changed. The threshold $m1t$ is crossed upwards in the case the value is incremented due to the absence of a successful reception. The threshold $m1t$ is crossed downwards, if the value is reset from a value above the threshold $m1t$ in the event of a successful reception. If the transmit mode is changed, this has to be signaled to the TxDev. If the counter is located at the TxDev, a device-internal signal is sufficient. If the counter is located at RxDev, a control message from the PDU receiver to the PDU transmitter is required.

10. If the survival time threshold in form of the sum of the survival time period st and the cycle time period is crossed, which represents the exceeding of the survival time, the radio device where the timer unit TU is located may: notify both the communication management and the application master to trigger any procedure to recover the application from the failed state; continue to receive, following its configured resources, until communication is available again.

Towards the end of the cyclic data exchange, the following shall be conducted:

1. The application master notifies TxDev to stop the periodical generation of data.

2. The application master signals the communication management, the radio resources for the time-critical communication streams are no longer needed.

3. The communication master reconfigures the incorporated devices: The counter value is not incremented; No counter-related events are forwarded between the devices; and any parameters related to the communication stream are deactivated on the radio devices.

Figure 8:
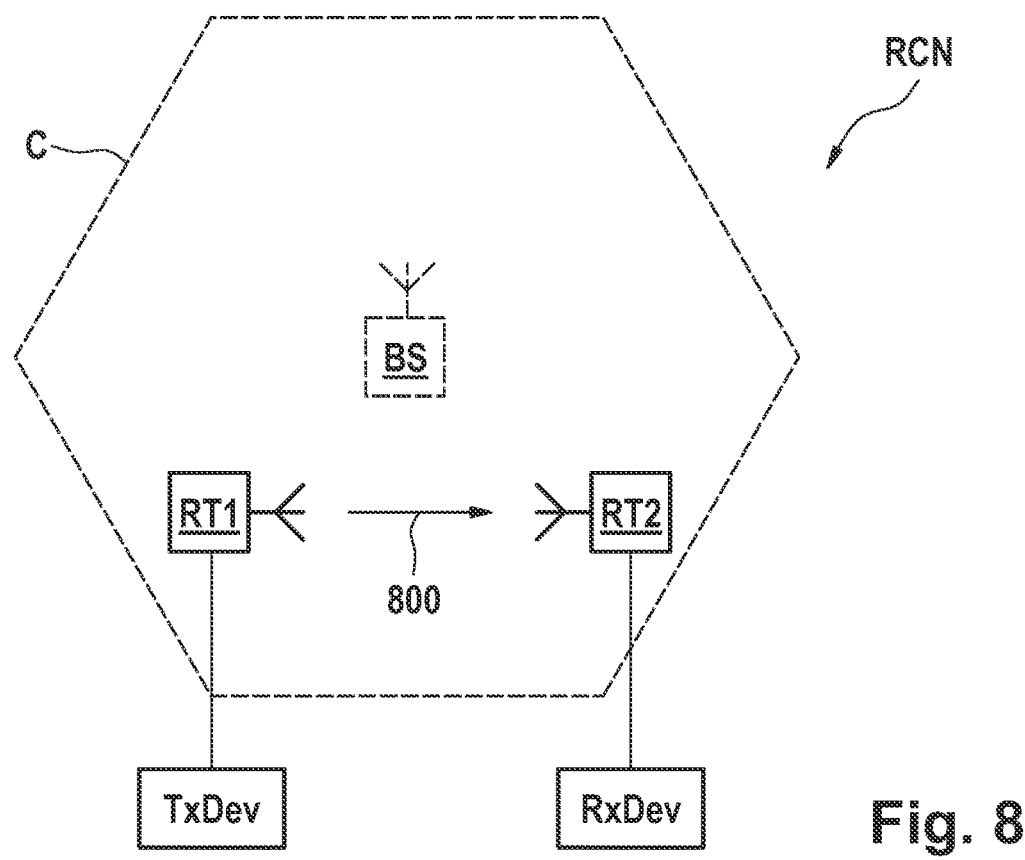
FIGS. 8, 9, 10, and 11 each depict schematically a radio communications network.

FIG. 8 depicts the radio communications network RCN. Radio terminals RT1 and RT2 are configured as the transmitting radio device TxDev and the receiving radio device RxDev. Accordingly, the data transmission is indicated by an arrow 800. A base station unit BS provides coverage in its provided cell C and schedules the radio resources for the radio terminals RT1 and RT2.

Figure 9:
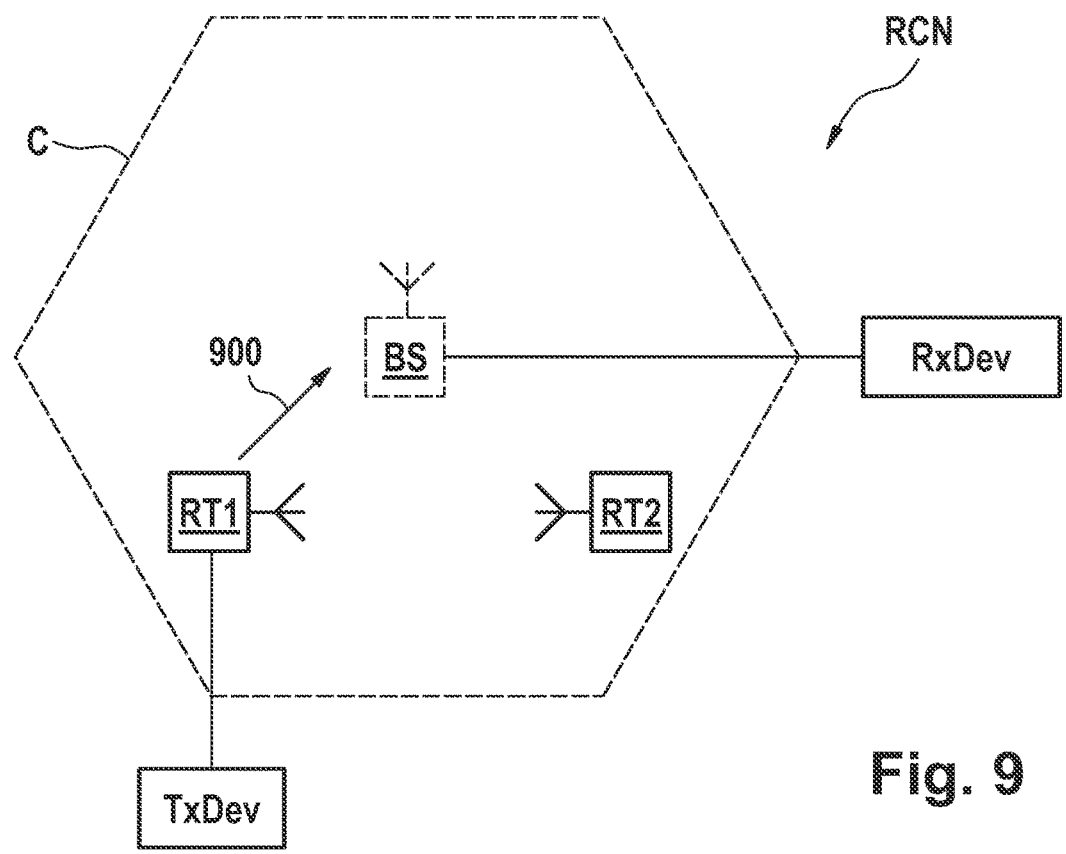

FIG. 9 depicts the radio communications network RCN. The radio terminal RT1 and the base station unit BS are configured as the transmitting radio device TxDev and the receiving radio device RxDev. Accordingly, the data transmission is indicated by an arrow 900 for data transmission in an uplink direction. The base station unit BS provides coverage in its provided cell C and schedules the radio resources for the radio terminals RT1 and RT2.

Figure 10:
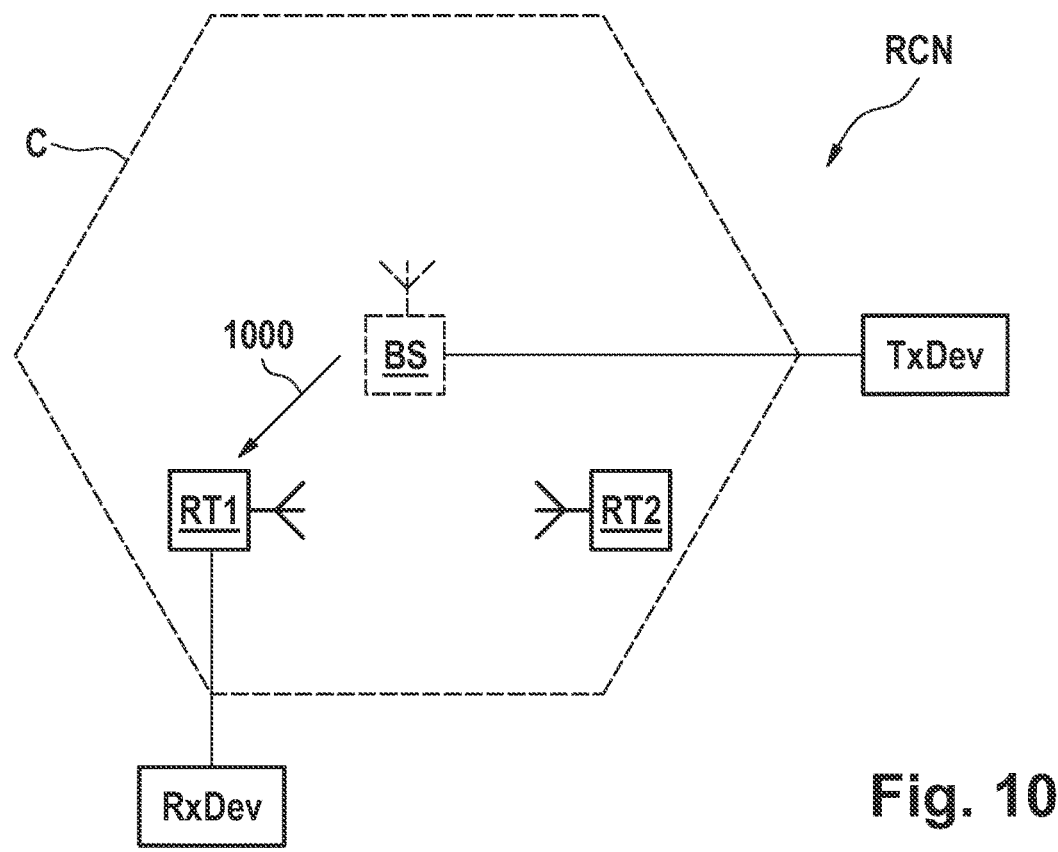

FIG. 10 depicts the radio communications network RCN. The base station unit BS and the radio terminal RT1 are configured as the transmitting radio device TxDev and the receiving radio device RxDev. Accordingly, the data transmission is indicated by an arrow 1000 for data transmission in a downlink direction. The base station unit BS provides coverage in its provided cell C and schedules the radio resources for the radio terminals RT1 and RT2.

Figure 11:
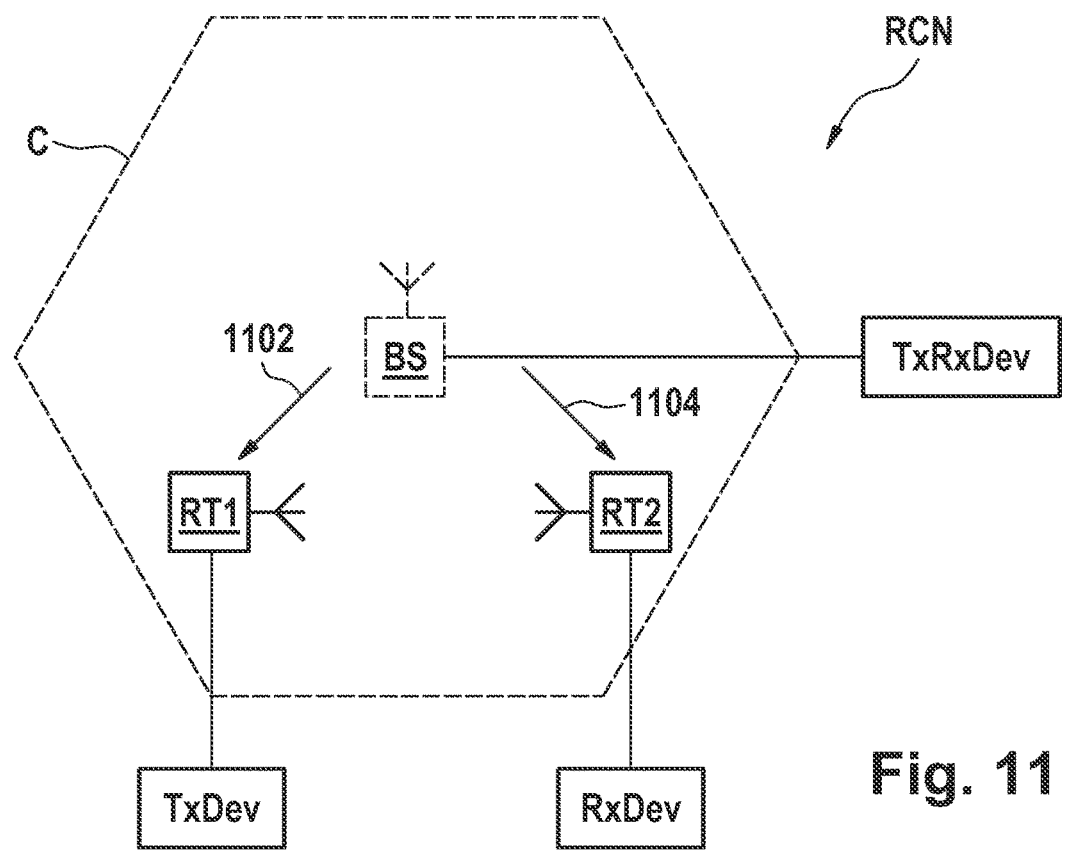

FIG. 11 depicts the radio communications network RCN. Radio terminals RT1 and RT2 are configured as the transmitting radio device TxDev and the receiving radio device RxDev. The base station unit BS resides in the middle and serves as the transceiving radio device TxRxDev. Accordingly, the data transmission is indicated by arrow 1102 for data transmission in the uplink direction and by arrow 1104 for data transmission in the downlink direction. The base station unit BS provides coverage in its provided cell C and schedules the radio resources for the radio terminals RT1 and RT2.

Figure 12:
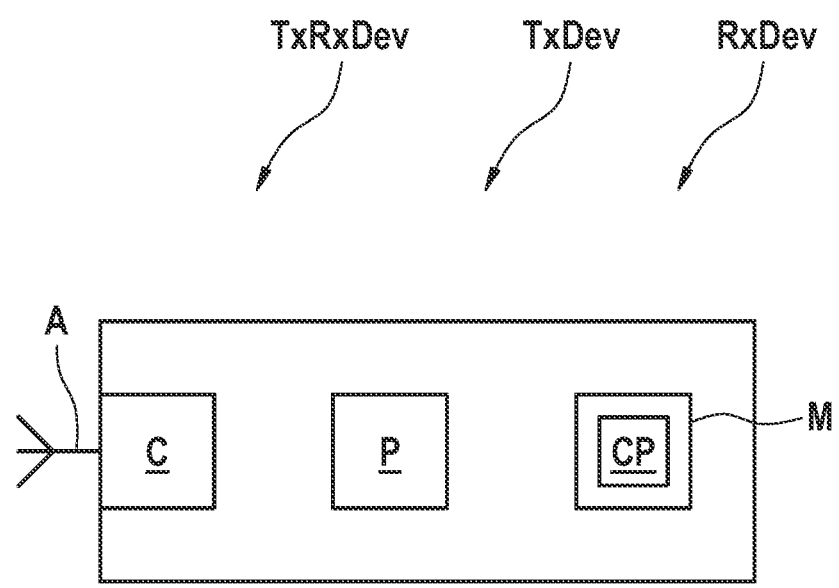
FIG. 12 depicts a structure of a radio device.

FIG. 12 depicts a structure of a radio device, wherein the radio device could be one of the transmitting radio device TxDev, the receiving radio device RxDev, and the transceiving radio device TxRxDev. Said radio device comprises at least one processor P, at least one memory M comprising computer program code CP, at least one communication module C, and at least one antenna A, wherein the computer program code CP is configured to interact with the at least one processor P, the at least one communication module C, and the at least one antenna A to cause the radio device to conduct the methods described above.

The invention claimed is:

1. A transmitting radio device (TxDev) of a radio communications network (RCN), wherein said transmitting radio device (TxDev) comprises at least one processor, at least one memory comprising computer program code, at least one communication module, and at least one antenna, wherein the computer program code is configured to interact with the at least one processor, the at least one communication module, and the at least one antenna to cause the transmitting radio device (TxDev) at least to:

transmit towards a receiving radio device (RxDev), first data (p1; p2) according to a first transmit mode (m1);

determine a first transmit mode time period (m1t) of the first transmit mode (m1) so that the first transmit mode time period (m1t) is less than half of a sum of a survival time period (st) and a cycle time period (k) associated with the transmitting radio device (TxDev);

determine a last reception time (t1) when a positive acknowledgment (ACK(p1)) was received from the receiving radio device (RxDev), the positive acknowledgement (ACK(p1) indicating a successful reception of the transmitted first data (p1) at the side of the receiving radio device (RxDev); and transmit, towards the receiving radio device (RxDev), second data (p3) according to a second transmit mode (m2), wherein the second transmit mode (m2) is activated upon expiry of the first transmit mode time period (m1t) since the determined last reception time (t1).

2. The transmitting radio device (TxDev; RxDev; TxRxDev) according to claim 1, wherein the first transmit mode time period (m1t) is greater than a cycle time period (k) of the application layer (APP1; APP2), wherein the cycle time period (k) indicates a cyclic provision of data by an application layer (APP1; APP2) and a cyclic transmission of data towards the receiving radio device (RxDev).

3. The transmitting radio device (TxDev; RxDev; TxRxDev) according to claim 1, wherein the second transmit mode (m2) comprises, in comparison with the first transmit mode (m1), at least one of the following:

an increased number of re-transmissions for the second data that was not successfully received at the receiving radio device (RxDev) or at a transceiving radio device (TxRxDev);

an increased number of blind re-transmissions for the second data;

a different modulation and coding scheme for the second data; and an increased number of allocated radio resources for the transmission of the second data.

4. The transmitting radio device (TxDev; RxDev; TxRxDev) according to claim 1, wherein a second transmit mode indicator (m2i) is transmitted towards a control layer to initiate scheduling of additional resources for the second transmit mode (m2).

5. The radio transmitting device (TxDev; TxRxDev) according to claim 1, wherein an application layer (APP1) of the transmitting device (TxDev) adds the first and second data at a first end of an egress queue of a control layer (C1), and wherein the control layer (C1) of the transmitting device (TxDev) removes the first and second data from a second end of the queue in order to transmit the first and second data towards the receiving device (RxDev).

6. A method to operate a transmitting radio device (TxDev) of a radio communications network (RCN), wherein the method comprises:

transmitting, towards a receiving radio device (RxDev), first data (p1; p2) according to a first transmit mode (m1);

determining a first transmit mode time period (m1t) of the first transmit mode (m1) so that the first transmit mode time period (m1t) is less than half of a sum of a survival time period (st) and a cycle time period (k) associated with the transmitting radio device (TxDev);

determining a last reception time (t1) when a positive acknowledgment (ACK(p1)) was received from the receiving radio device (RxDev), the positive acknowledgement (ACK(p1) indicating a successful reception of the transmitted first data (p1) at the side of the receiving radio device (RxDev); and transmitting, towards the receiving radio device (RxDev), second data (p3) according to a second transmit mode (m2), wherein the second transmit mode (m2) is activated upon expiry of the first transmit mode time period (m1t) since the determined last reception time (t1).

7. A receiving radio device (RxDev) of a radio communications network (RCN), wherein said receiving radio device (RxDev) comprises at least one processor, at least one memory comprising computer program code, at least one communication module, and at least one antenna, wherein the computer program code is configured to interact with the at least one processor, the at least one communication module, and the at least one antenna to cause the receiving radio device (RxDev) at least to:

receive, from a transmitting radio device (TxDev), first data (p4);

determine a maximum value based on a first transmit mode time period (m1t) of a first transmit mode (m1) so that the first transmit mode time period (m1t) is less than half of a sum of a survival time period (st) and a cycle time period (k) associated with the transmitting radio device (TxDev);

determine a last reception time (t1) when the first data (p4) was successfully received from the transmitting radio device (TxDev); and transmit, towards the transmitting radio device (TxDev), a second transmit mode indicator (m2i) upon expiry of the first transmit mode time period (m1t) since the determined last reception time (t1).

8. The receiving radio device (RxDev) according to claim 7, further being configured to
transmit, towards the transmitting device (TxDev), a first transmit mode indicator (m1*i*) upon successfully receiving second data (p6) from the transmitting device (TxDev).

9. A method to operate a receiving radio device (RxDev) of a radio communications network (RCN), wherein the method comprises:
receiving, from a transmitting radio device (TxDev), first data (p4);
determining a maximum value based on a first transmit mode time period (m1*t*) of a first transmit mode (m1) so that the first transmit mode time period (m1*t*) is less than half of a sum of a survival time period (st) and a cycle time period (k) associated with the transmitting radio device (TxDev);
determining a last reception time (t1) when the first data (p4) was successfully received from the transmitting radio device (TxDev); and
transmitting, towards the transmitting radio device (TxDev), a second transmit mode indicator (m2*i*) upon expiry of the first transmit mode time period (m1*t*) since the determined last reception time (t1).

10. A transmitting radio device (TxDev) of a radio communications network (RCN), wherein said transmitting radio device (TxDev) comprises at least one processor, at least one memory comprising computer program code, at least one communication module, and at least one antenna, wherein the computer program code is configured to interact with the at least one processor, the at least one communication module, and the at least one antenna to cause the transmitting radio device (TxDev) at least to:
transmit, towards a receiving radio device (RxDev), first data (p4; p5) according to a first transmit mode (m1);
receive, from the receiving radio device (RxDev), a second transmit mode indicator (m2*i*), wherein the second transmit mode indicator (m2*i*) indicates that a first mode time period (m1*t*) of the first transmit mode (m1) has lapsed and the first transmit mode time period (m1*t*) is less than half of a sum of a survival time period (st) and a cycle time period (k); and
transmit, towards the receiving radio device (RxDev), second data (p6) according to a second transmit mode (m2), wherein the second transmit mode (m2) is activated upon reception of the second transmit mode indicator (m2*i*).

11. The transmitting radio device (TxDev) according to claim 10, further being configured to
receive, from the receiving device (RxDev), a first transmit mode indicator (m1*i*) indicating a successful reception of the second data (p6) by the transmitting device (TxDev); and
transmit, towards the receiving radio device (RxDev), first data (p1; p2) according to the first transmit mode (m1) upon the reception of the first transmit mode indicator (m1*i*).

12. A method to operate a transmitting radio device (TxDev) of a radio communications network (RCN), wherein the method comprises:
transmitting, towards a receiving radio device (RxDev), first data (p4; p5) according to a first transmit mode (m1);
receiving, from the receiving radio device (RxDev), a second transmit mode indicator (m2*i*), wherein the second transmit mode indicator (m2*i*) indicates that a first mode time period (m1*t*) of the first transmit mode (m1) has lapsed and the first transmit mode time period (m1*t*) is less than half of a sum of a survival time period (st) and a cycle time period (k); and
transmitting, towards the receiving radio device (RxDev), second data (p6) according to a second transmit mode (m2), wherein the second transmit mode (m2) is activated upon reception of the second transmit mode indicator (m2*i*).

13. A transceiving radio device (TxRxDev) of a radio communications network (RCN), wherein said transceiving radio device (TxRxDev) comprises at least one processor, at least one memory comprising computer program code, at least one communication module, and at least one antenna, wherein the computer program code is configured to interact with the at least one processor, the at least one communication module, and the at least one antenna to cause the transceiving radio device (TxRxDev) at least to:
receive from a transmitting radio device (TxDev), first data (p7; p8);
transmit, to a receiving radio device (RxDev), the first data (p7; p8);
determine a last reception time (t1) when a positive acknowledgment (ACK(p7)) was received from the receiving radio device (RxDev), the positive acknowledgement (ACK(p7)) indicating a successful reception of the transmitted first data (p7) at the side of the receiving radio device (RxDev); and
transmit, towards the transmitting radio device (TxDev), a second transmit mode indicator (m2*i*) upon expiry of a first transmit mode time period (m1*t*) since the determined last reception time (t1), wherein the first transmit mode time period (m1*t*) of a first transmit mode (m1) is less than half of a sum of a survival time period (st) and a cycle time period (k) associated with the transmitting radio device (TxDev).

14. A method to operate a transceiving radio device (TxRxDev) of a radio communications network (RCN), wherein the method comprises:
receiving from a transmitting radio device (TxDev), first data (p7; p8);
transmitting, to a receiving radio device (RxDev), the first data (p7; p8);
determining a last reception time (t1) when a positive acknowledgment (ACK(p7)) was received from the receiving radio device (RxDev), the positive acknowledgement (ACK(p7)) indicating a successful reception of the transmitted first data (p7) at the side of the receiving radio device (RxDev); and
transmitting towards the transmitting radio device (TxDev), a second transmit mode indicator (m2*i*) upon expiry of a first transmit mode time period (m1*t*) since the determined last reception time (t1), wherein the first transmit mode time period (m1*t*) of a first transmit mode (m1) is less than half of a sum of a survival time period (st) and a cycle time period (k).

\* \* \* \* \*